US007096111B2

(12) United States Patent
Birkner et al.

(10) Patent No.: US 7,096,111 B2
(45) Date of Patent: Aug. 22, 2006

(54) METHOD FOR CONVERTING A FUEL QUANTITY INTO A TORQUE

(75) Inventors: Christian Birkner, Irlbach (DE); Johannes Feder, Regensburg (DE); Rainer Hirn, Neutraubling (DE); Achim Przymusinski, Lappersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/808,900

(22) Filed: Mar. 25, 2004

(65) Prior Publication Data

US 2004/0181332 A1 Sep. 16, 2004

Related U.S. Application Data

(63) Continuation of application No. PCT/DE03/02279, filed on Jul. 8, 2003.

(30) Foreign Application Priority Data

Jul. 30, 2002 (DE) ................................ 102 34 706

(51) Int. Cl.
*F02D 41/00* (2006.01)
*G06F 19/00* (2006.01)

(52) U.S. Cl. ....................................... 701/104; 123/480

(58) Field of Classification Search ................ 701/104, 701/102, 105, 93, 54; 123/478, 480; 477/110, 477/111, 54
See application file for complete search history.

(56) References Cited

U.S. PATENT DOCUMENTS

| | | | | |
|---|---|---|---|---|
| 4,212,278 | A * | 7/1980 | Eisinger et al. | 123/319 |
| 4,957,194 | A * | 9/1990 | Sawa et al. | 477/169 |
| 5,615,654 | A | 4/1997 | Weisman, II et al. | 123/350 |
| 6,440,038 | B1 * | 8/2002 | Holloway | 477/54 |
| 6,578,546 | B1 * | 6/2003 | Schultalbers et al. | 123/480 |
| 6,915,202 | B1 * | 7/2005 | Folke | 701/104 |

FOREIGN PATENT DOCUMENTS

| | | | |
|---|---|---|---|
| DE | 197 26 724 | A1 | 11/1998 |
| DE | 198 49 329 | A1 | 4/2000 |
| DE | 100 00 918 | A1 | 7/2001 |
| JP | 5-214999 | A * | 8/1993 |
| WO | WO 01/51794 | A1 | 7/2001 |

OTHER PUBLICATIONS

Van Basshuysenn, R., et al.; “Handbuch Verbrennungsmotor”; Vieweg-Verlag, Wiesbaden, 2. pp. 22-23, Aug. 2002.

* cited by examiner

*Primary Examiner*—Hieu T. Vo
(74) *Attorney, Agent, or Firm*—Baker Botts L.L.P.

(57) ABSTRACT

With a method for converting a fuel quantity (MF) into a torque (TQ) in an internal combustion engine, the efficiency (H) of the internal combustion engine is determined at the current operating point prior to the conversion as the ratio of actual torque (TQ) and actual fuel quantity (MF), and the required torque (MF) is determined from the efficiency (H) and the fuel quantity (MF).

15 Claims, 2 Drawing Sheets

METHOD FOR CONVERTING A FUEL QUANTITY INTO A TORQUE

CROSS REFERENCE TO RELATED APPLICATION

This application is a continuation of International Application No. PCT/DE03/02279 filed Jul. 8, 2003 which designates the United States, and claims priority to German application no. 102 34 706.9 filed Jul. 30, 2002.

TECHNICAL FIELD

The invention relates to a method for converting a nominal fuel quantity into a nominal torque in an internal combustion engine.

DESCRIPTION OF THE RELATED ART

Torque-based control structures are used increasingly in internal combustion engines. Structures of this kind process all power demands made on the internal combustion engine in the form of torque requirements, link these torque requirements in a suitable operating point-dependent manner to produce a total torque and from this generate a value for a fuel quantity that must be supplied to the internal combustion engine in order to handle the required operation, i.e. to fulfill the torque requirements. In the case of diesel internal combustion engines, the fuel quantity can be, for example, a fuel mass which is to be injected into the combustion chambers of the internal combustion engine by means of an injection system.

Torque-based structures of this kind have the advantage that further functionalities relating to the power demands that they make on the internal combustion engine can be easily integrated. If, for example, an internal combustion engine is to be adapted for operation with an air conditioning system, it is merely necessary to factor in the torque requirement for an air conditioning system in addition when the total torque is generated in the torque-based structure. The structures mentioned therefore provide great flexibility in the adaptation of a control system to a given internal combustion engine model.

This is particularly valid since the conversion of the total torque present at the end of the torque-based structure into parameters for the fuel supply, for example into parameters for controlling an injection system, is highly internal combustion engine-specific. Typically used here is an engine characteristic map which determines the optimal fuel mass from a torque requirement for the respective operating point, as previously this parameter was generally the only parameter to be varied in an injection system. The engine characteristic map used for this is also referred to as the main engine characteristic map on account of its central function.

With the emergence of injection systems that use injectors which are fed from high-pressure accumulators and which are largely freely controllable, it is now possible to use not only the fuel mass, but also a virtually freely selectable variation of injection operations for a single combustion operation. However, in order to control injection systems which allow a plurality of degrees of freedom, existing main engine characteristic maps are no longer adequate; as an alternative to said maps, complexly linked engine characteristic map records are used instead.

This increasing complexity of the conversion of a required total torque into a fuel quantity results in the problem that correspondingly it is also becoming increasingly difficult to convert a fuel mass into a torque. Conversions of this kind, as required in the method of the type mentioned, occur for example when fuel quantity limit values, for example a maximum fuel quantity which can be released by an injection system, have to be converted into a nominal torque so that they can be taken into account in a typical torque-based control structure. A further example of a fuel quantity limit value which often has to be converted into a torque during operation can be found in smoke limiting functions of the type that are standard for modern diesel internal combustion engines. Under the control of operating parameters, functions of this kind output a maximum fuel mass which must not be exceeded if undesirable smoke formation is to be avoided. In order to integrate functions of this kind into a torque-based control structure, a nominal fuel mass has to be converted into a nominal torque.

In the prior art it was possible to do this using an inverse engine characteristic map to the main engine characteristic map. Given the increasing complexity of the main engine characteristic map mentioned above, however, an inversion of this kind is henceforth only possible with very great overhead or only to a limited extent.

SUMMARY OF THE INVENTION

The object of the invention is therefore to develop a method of the type cited at the beginning in such a way that a conversion of fuel quantity into torque can be carried out in a non-compute-intensive manner and in particular the requirement for invertible main engine characteristic maps can be dispensed with.

This object is achieved according to the invention in that, before the conversion at the current operating point, the efficiency of the internal combustion engine is determined as a ratio of actual torque and actual fuel quantity and the nominal torque is determined from the efficiency and the nominal fuel quantity.

The concept according to the invention therefore no longer attempts to execute the conversion of torque into fuel quantity in inverted form which takes place in the torque-based structure, but instead employs a means of determining the efficiency of the internal combustion engine, this efficiency being understood as a ratio of torque to fuel quantity, i.e. not taking into account a power output by the internal combustion engine. Based on this efficiency, as present at the current operating point, a simple conversion of fuel quantity into torque can be performed without conversion being reliant on complicated engine characteristic maps. As a result the amount of memory space required for engine characteristic maps of this kind is reduced. At the same time the conversion time or the computing overhead necessary for this can be reduced.

In the simplest case the efficiency can be calculated by division of the torque output at the last injection time by the fuel quantity simultaneously supplied to the internal combustion engine. This calculation method can be refined in the form of an efficiency extrapolation which infers the efficiency at the next calculation time from the efficiency that was present previously. Any extrapolation methods are, of course, suitable for the invention, which is why it is preferred that an extrapolation of the efficiency is used to determine the torque. As a rule an extrapolation is easy to perform in particular when it is a linear extrapolation. For this reason an extrapolation of this type is particularly preferred.

Linear extrapolations generally yield good results when, measured against the shape of the extrapolating functionality, i.e. an efficiency curve, they lie in the range of validity of a linear approximation of the curve. In other words, the extrapolation may only be performed over ranges in which the efficiency curve deviates only comparatively slightly from a linear shape.

However, as the efficiency of an internal combustion engine varies as a function of the supplied fuel mass (and as a function of further operating parameters, such as operating temperature, etc.), in cases in which a fuel quantity is to be converted which differs sharply from the fuel mass which was supplied during the last injection this simple computing method can sometimes lead to an erroneous value. With internal combustion engines, the efficiency usually increases from low fuel masses up to a medium-sized fuel mass, and then decreases again. If the internal combustion engine is thus operated with a low fuel mass, and if a torque for a high fuel mass is to be calculated, an error which is sometimes outside the range of tolerance can arise with the computing scheme mentioned.

For cases of this kind it is beneficial if the efficiency is determined using an efficiency curve which indicates the maximum ratio of torque and fuel quantity as a function of the fuel quantity. By means of a curve of this kind an accurate determination of the nominal torque can also be achieved for the nominal fuel quantity, e.g. by calculation of the efficiency for the current fuel mass and selection of an appropriate efficiency curve for this. Selecting the suitable efficiency curve then takes account of the internal combustion engine parameters in addition to the fuel mass; these can include, among others, speed, operating temperature of the internal combustion engine, setting of a supercharging device (e.g. turbocharger), intake air temperature, ambient atmospheric pressure, fuel quality, etc.

Instead of selecting a suitable efficiency curve it is of course also possible to work with a standard efficiency curve which assumes certain standard operating conditions. By means of this simplification the memory requirement for converting a fuel mass into a torque is further reduced.

In order to increase the accuracy of the conversion with this simplified variant, the ratio of actual torque and actual fuel quantity at the current operating point can then additionally be compared with the efficiency indicated by the efficiency curve (valid for standard operating conditions) and, depending on the result of this comparison, the efficiency curve modified, with the result that the nominal torque is then determined by means of the modified efficiency curve. This approach combines the advantages of a very accurate determination of the nominal torque for the desired nominal fuel quantity with the advantages that only a single efficiency curve needs to be held resident in a memory.

In the modification a wide variety of manipulations can be performed on the efficiency curve, for example multiplication with a fuel mass-dependent factor or similar. It is particularly simple and yet surprisingly accurate to form the difference between calculated and indicated efficiency during the comparison and to shift the efficiency curve by precisely this difference during the modification. The underlying assumption here, that operating parameters deviating from the standard operating conditions essentially lead to a shift in the efficiency curve, has revealed itself as suitable for most applications.

In a combination of the extrapolation approach mentioned with the use of efficiency curves, an extrapolation is always used when the actual fuel mass differs only slightly from the nominal fuel mass to be converted. If the difference lies above a specific threshold value and therefore an extrapolation is too prone to error, reference is made to an efficiency curve. This combination marries computing economy to a high degree of accuracy. A development of the invention is therefore preferred wherein, in order to determine the nominal torque, the extrapolation is performed when a difference between actual fuel quantity and nominal fuel quantity lies below a specific threshold value, and wherein otherwise the (modified) efficiency curve is generated and used for determining the nominal torque.

A common application in which a nominal fuel quantity has to be converted into a nominal torque arises, as has been mentioned already, with a smoke limiting function of a diesel internal combustion engine. In that case the method can be used to particular advantage. It is therefore to be preferred that the nominal fuel quantity is an operating point-dependent maximum fuel quantity determined by a predefined smoke behavior of the internal combustion engine, whereby, if said maximum fuel quantity is exceeded, an impermissible smoke generation would result at the operating point due to the internal combustion engine.

BRIEF DESCRIPTION OF THE DRAWINGS

The invention is described in more detail below with reference to the drawing by way of example.

The figures show.

DETAILED DESCRIPTION OF THE PREFERRED EMBODIMENTS

Figure 1:
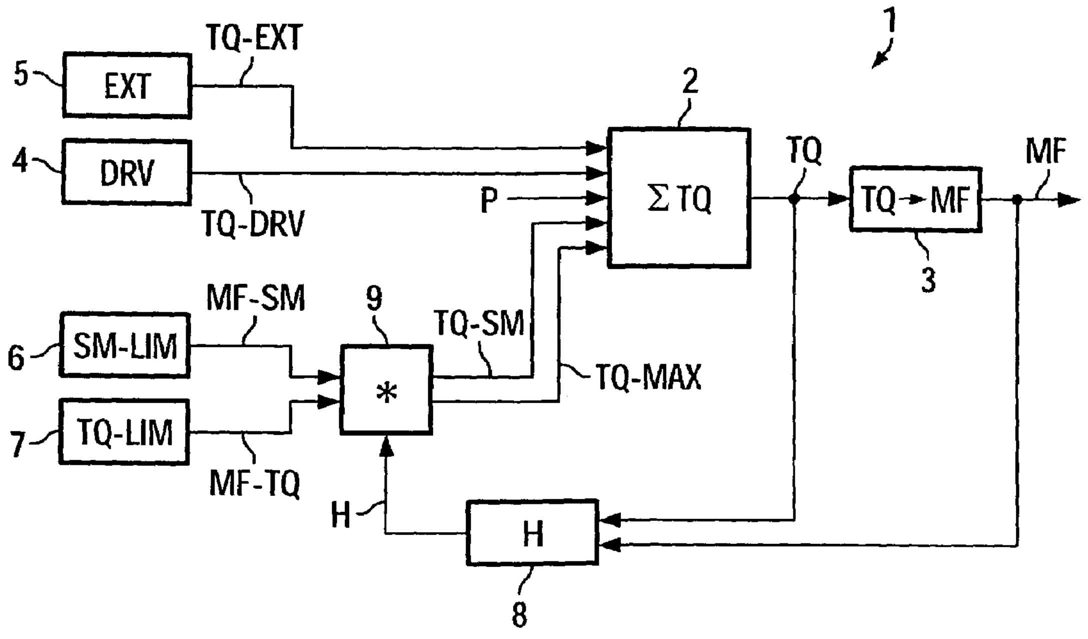
FIG. 1 a block diagram for a torque-based control structure depicting a conversion of a nominal fuel quantity into a nominal torque, FIG. 2 an alternative embodiment of the conversion shown in FIG. 2, FIG. 3 a torque curve which can be used for the conversion of a nominal fuel quantity into a nominal torque, and FIG. 4 the progression of an efficiency extrapolation for converting a nominal fuel quantity into a nominal torque.

FIG. 1 shows a block diagram depicting a torque-based structure for determining the fuel quantity which is to be supplied to an internal combustion engine. In this case the torque-based structure 1 evaluates various input variables in order to determine a fuel mass MF which is a parameter for an injection system of a diesel internal combustion engine. Here, the torque-based structure 1 specifies not only the value of the fuel mass MF, but also how this is to be supplied using a specific injection curve, i.e. how the fuel mass MF is to be distributed to pre-injection (pilot), main injection and post-injection pulses.

The torque-based structure 1 comprises as its core element a torque calculation unit 2, which calculates from different input variables a total torque TQ which is required by the internal combustion engine. Here, the input variables of the torque calculation unit 2 essentially comprise torque requirements which are suitably linked as a function of the operating parameters P which the torque calculation unit 2 also receives. The design and function of a torque calculation unit 2 of this kind are known to a person skilled in the art.

The value output by the torque calculation unit 2 for the torque TQ is then converted in a main engine characteristic map 3 into the value for the fuel mass MF as well as into the cited parameters for controlling the injection curve. For the application of the torque-based structure 1 to an internal combustion engine model, basically only the main engine characteristic map 3 has to be adjusted accordingly, since it is only here that the engine-related factors of the internal combustion engine model are taken into account.

On the input side the torque calculation unit 2 processes various torque requirements. The most important of these is a torque requirement TQ-DRV originating from an accelerator pedal transmitter 4, said torque requirement representing the torque required by the driver of a motor vehicle equipped with the internal combustion engine. The torque calculation unit 2 also takes into account external torque requirements 5 which, in the block diagram shown in FIG. 1, are supplied to the torque calculation unit 2 in the form of a torque requirement TQ-EXT. External torque requirements 5 of this kind can be, for example, requirements from external power loads such as air conditioning systems or similar. A speed control system is also an example of an external torque requirement 5.

It is provided in the concept of the torque-based structure 1 that only torque requirements are supplied to the torque calculation unit 2. That said, however, there are individual functions which output, not a torque requirement, but a fuel mass limit value. Examples of these are a smoke limiting unit 6 or a torque limiting unit 7, both of which output values for fuel masses which (at the current operating point) must not be exceeded on account of exhaust gas- or engine-related factors. The fuel mass limit values MF-SM and MF-TQ output by these units cannot now be simply supplied to the torque calculation unit 2, as the latter cannot process values for fuel masses. It is therefore essential to convert these fuel mass limit values into torque limit values. In the torque-based structure shown in FIG. 1, there is provided for this conversion an efficiency calculation module 8 which accepts the value for the fuel mass MF, as output by the main engine characteristic map 3, and the value for the torque TQ output by the torque calculation unit 2. In a manner still to be described, the efficiency calculation module 8 converts these two values, torque TQ and fuel mass MF, into an efficiency H which, by means of a simple multiplication in a multiplier 9, permits the fuel mass limit values MF-SM and MF-TQ to be converted into corresponding torque limit values TQ-SM and TQ-MAX respectively. These can then be fed in to the torque calculation unit so that the function of the smoke limiting unit 6 and the torque limiting unit 7, which, in the block diagram shown in FIG. 1, stand as examples of functions which output a fuel mass value, can be taken into account in a simple manner in the torque-based structure 1.

Figure 2:
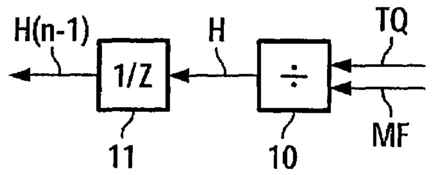

FIG. 2 shows in the form of a block diagram a possible implementation of the efficiency calculation module 8 in detail. Said module first calculates the ratio from torque TQ and fuel mass MF in a multiplier 10 and thus outputs a value as efficiency H. Subsequently, in a delay element 11, a delay by one calculation clock pulse takes place, so that the efficiency for the next-but-last computing clock pulse is present on the output side of the delay element 11. This is symbolized in FIG. 2 by the addition (n−1).

With this efficiency H, the nominal fuel quantities in the form of the fuel mass limit values MF-SM and MF-TQ are then converted in the multiplier 9 into nominal torque values in the form of the torque limit values TQ-SM and TQ-MAX. The implementation concept of the efficiency calculation module 8 as set forth in the block diagram shown in FIG. 2 therefore makes provision for the efficiency from the preceding calculation cycle to be used for the current conversion of nominal fuel mass into nominal torque.

Figure 3:
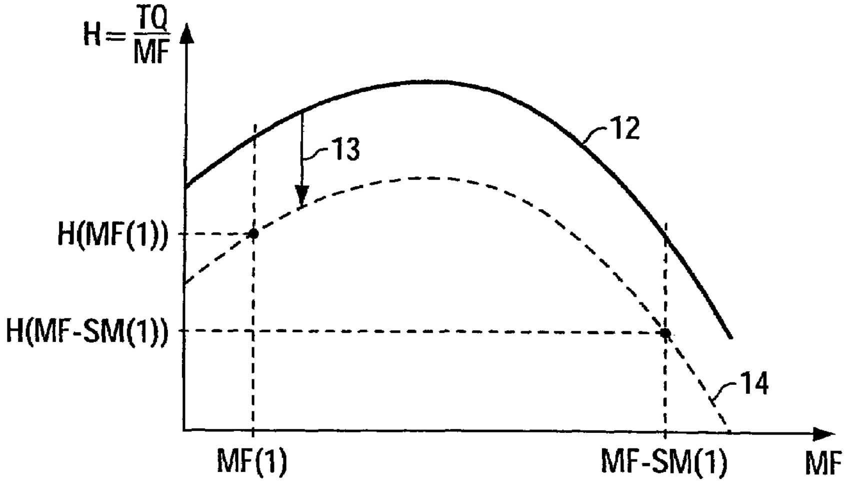

The efficiency calculation module 8 can also be implemented in a different way, however. For example, recourse can be made to an efficiency curve 12, as depicted in FIG. 3. The efficiency curve 12 shown in FIG. 3, which in that case represents the efficiency as the ratio of torque TQ and fuel mass MF over the fuel mass MF, reflects the maximum efficiency H which the internal combustion engine can reach with the respective fuel mass. Since the efficiency H is of course dependent on operating parameters of the internal combustion engine—thus, for example, the operating temperature of the internal combustion engine is an important influencing variable—, the efficiency curve 12 is only valid for certain standard operating parameters. Outside of these operating parameters the efficiency for a given fuel mass will generally be lower. It is also conceivable that for certain ranges in the case of operating conditions deviating from the standard operating parameters a higher efficiency can sometimes be achieved.

If the efficiency module now receives a value for a fuel mass MF(1) for determining the efficiency at a time (1), it first checks whether the efficiency H(MF(1))=TQ(1)/MF(1) present at the current torque TQ(1) lies on the efficiency curve 12. The efficiency module 8 achieves this by determining the efficiency H for the fuel mass MF(1) from the curve 12 and comparing it with the calculated value. Any difference is then used to effect a shift 13 of the efficiency curve 12 into a modified efficiency curve 14.

By means of the efficiency curve 14 shifted by the shift 13 obtained in this way, the efficiency for the fuel mass limit value MF-SM(1), as output by the smoke limiting unit 6 at the current operating point, can then be easily determined. FIG. 3 clearly shows that on account of the shift 13 the efficiency H(MF-SM(1)) thus obtained deviates markedly from that that would be obtained with the original efficiency curve 12. As an alternative to the modification of the efficiency curve 12, the shift 13 can also be applied directly to the efficiency H which the unmodified efficiency curve 12 indicates for the fuel mass limit value MF-SM(1).

The efficiency 8 determined in this way is then used in the multiplier 9 for determining the desired torque limit value TQ-SM. A similar method is also used for the fuel mass limit value MF-TQ which is output by the torque limiting unit 7.

The approach depicted in FIG. 3 of using the efficiency curve 12 in the efficiency calculation module 8 is advantageous in particular when the fuel mass which the torque-based structure 1 provides for the internal combustion engine at the current time MF(1) differs widely from the fuel mass limit value MF-SM or MF-TQ, with the result that the assumption that the same efficiency applies for the fuel mass limit value as for the current operating point would lead to impermissible errors in the determination of the torque limit values.

Figure 4:
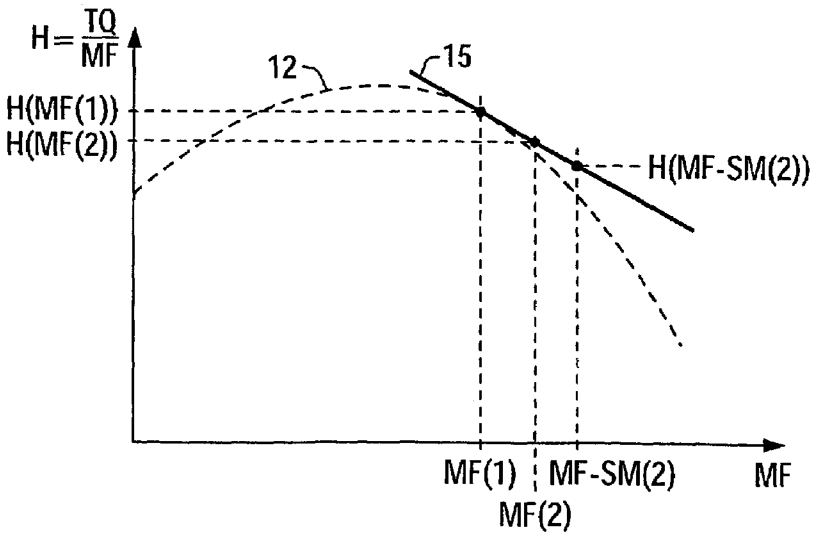

If the difference between the current value for the fuel mass MF(1) and the fuel mass limit value is only slight, in particular if it is below a specific threshold value, the efficiency calculation module 8 omits to refer to an efficiency curve 12 and instead uses an extrapolation. In this case an efficiency H(MF(1)) is determined from the fuel mass MF(1) and the current torque TQ(1) at the current time. At the next calculation clock pulse (2) the same happens for the now present fuel mass MF(2) and the now present torque TQ(2). The resulting change in efficiency (the efficiency H(MF(2)) is now given) and fuel mass is used for an extrapolation which is illustrated in FIG. 4 by an extrapolation straight line 15. It is therefore assumed that owing to the deviation of the value for the current fuel mass MF from the current fuel mass limit value (e.g. MF-SM), said deviation lying below a predetermined threshold value, a linear approximation of the efficiency curve 12 (drawn in as a dashed line in FIG. 4 for clarity) is possible. As a result of the extrapolation, the efficiency H lying on the extrapolation straight line 15 for the fuel mass limit value (e.g. MF-SM(2)) is then obtained. This is then output by the efficiency calculation module 8 and used in the multiplier 9.

We claim:

1. A method for converting a nominal fuel quantity into a nominal torque for an internal combustion engine, comprising the steps of:

prior to the conversion at the current operating point, determining the efficiency of the internal combustion engine as a ratio of actual torque and actual fuel quantity, and determining the nominal torque from the efficiency and the nominal fuel quantity.

2. The method according to claim 1, wherein an extrapolation of the efficiency is used to determine the nominal torque.

3. The method according to claim 1, wherein in order to determine the efficiency use is made of an efficiency curve which indicates the maximum ratio of torque and fuel quantity as a function of the fuel quantity.

4. The method according to claim 3, wherein at the current operating point the ratio of actual torque and actual fuel quantity is calculated and compared with the efficiency indicated by the efficiency curve and, depending on the result of this comparison, the efficiency curve is modified, and wherein the nominal torque is determined by the modified efficiency curve.

5. The method according to claim 4, wherein in the comparison the difference between calculated and indicated efficiency is formed and during the modification the efficiency curve is shifted by this difference.

6. The method according to claim 1, wherein an extrapolation of the efficiency is used to determine the nominal torque, in order to determine the efficiency use is made of an efficiency curve which indicates the maximum ratio of torque and fuel quantity as a function of the fuel quantity, at the current operating point the ratio of actual torque and actual fuel quantity is calculated and compared with the efficiency indicated by the efficiency curve and, depending on the result of this comparison, the efficiency curve is modified, the nominal torque is determined by means of the modified efficiency curve, wherein in order to determine the nominal torque the extrapolation is performed if a difference between actual fuel quantity and nominal fuel quantity lies below a specific threshold value, and otherwise the modified efficiency curve is generated and used in order to determine the nominal torque.

7. The method according to claim 1, wherein an extrapolation of the efficiency is used to determine the nominal torque, in order to determine the efficiency use is made of an efficiency curve which indicates the maximum ratio of torque and fuel quantity as a function of the fuel quantity, at the current operating point the ratio of actual torque and actual fuel quantity is calculated and compared with the efficiency indicated by the efficiency curve and, depending on the result of this comparison, the efficiency curve is modified, in the comparison the difference between calculated and indicated efficiency is formed and during the modification the efficiency curve is shifted by this difference, the nominal torque is determined by means of the modified efficiency curve, in order to determine the nominal torque the extrapolation is performed if a difference between actual fuel quantity and nominal fuel quantity lies below a specific threshold value, and otherwise the modified efficiency curve is generated and used in order to determine the nominal torque.

8. The method according to claim 1, wherein the nominal fuel quantity is an operating point-dependent maximum fuel quantity determined by a predefined smoke behavior of the internal combustion engine.

9. A method for converting a nominal fuel quantity into a nominal torque for an internal combustion engine, comprising the steps of:

prior to the conversion at the current operating point, determining the efficiency of the internal combustion engine as a ratio of actual torque and actual fuel quantity by using an efficiency curve which indicates the maximum ratio of torque and fuel quantity as a function of the fuel quantity, and determining the nominal torque from the efficiency and the nominal fuel quantity.

10. The method according to claim 9, wherein an extrapolation of the efficiency is used to determine the nominal torque.

11. The method according to claim 9, wherein at the current operating point the ratio of actual torque and actual fuel quantity is calculated and compared with the efficiency indicated by the efficiency curve and, depending on the result of this comparison, the efficiency curve is modified, and wherein the nominal torque is determined by the modified efficiency curve.

12. The method according to claim 11, wherein in the comparison the difference between calculated and indicated efficiency is formed and during the modification the efficiency curve is shifted by this difference.

13. The method according to claim 9, wherein an extrapolation of the efficiency is used to determine the nominal torque, at the current operating point the ratio of actual torque and actual fuel quantity is calculated and compared with the efficiency indicated by the efficiency curve and, depending on the result of this comparison, the efficiency curve is modified, the nominal torque is determined by means of the modified efficiency curve, wherein in order to determine the nominal torque the extrapolation is performed if a difference between actual fuel quantity and nominal fuel quantity lies below a specific threshold value, and otherwise the modified efficiency curve is generated and used in order to determine the nominal torque.

14. The method according to claim 9, wherein an extrapolation of the efficiency is used to determine the nominal torque, at the current operating point the ratio of actual torque and actual fuel quantity is calculated and compared with the efficiency indicated by the efficiency curve and, depending on the result of this comparison, the efficiency curve is modified, in the comparison the difference between calculated and indicated efficiency is formed and during the modification the efficiency curve is shifted by this difference, the nominal torque is determined by means of the modified efficiency curve, in order to determine the nominal torque the extrapolation is performed if a difference between actual fuel quantity and nominal fuel quantity lies below a specific threshold value, and otherwise the modified efficiency curve is generated and used in order to determine the nominal torque.

15. The method according to claim 9, wherein the nominal fuel quantity is an operating point-dependent maximum fuel quantity determined by a predefined smoke behavior of the internal combustion engine.

* * * * *